United States Patent
So et al.

(10) Patent No.: US 10,873,222 B2
(45) Date of Patent: Dec. 22, 2020

(54) SYSTEM AND METHOD FOR PREVENTING CROSS CONNECTION IN WIRELESS CHARGING

(71) Applicant: Hong Kong Applied Science and Technology Research Institute Company Limited, Hong Kong (CN)

(72) Inventors: Iek Po So, Hong Kong (CN); Hang Sang Lee, Hong Kong (CN); Jun Chen, Hong Kong (CN)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 453 days.

(21) Appl. No.: 15/935,068

(22) Filed: Mar. 26, 2018

(65) Prior Publication Data

US 2019/0296583 A1     Sep. 26, 2019

(51) Int. Cl.
*H02J 50/80*     (2016.01)
*H02J 50/12*     (2016.01)
(Continued)

(52) U.S. Cl.
CPC ............ *H02J 50/80* (2016.02); *H02J 7/025* (2013.01); *H02J 50/12* (2016.02); *H04W 76/30* (2018.02)

(58) Field of Classification Search
CPC .. H02J 50/10; H02J 50/12; H02J 50/60; H02J 50/80; H02J 2007/0096; H04W 76/30
(Continued)

(56) References Cited

U.S. PATENT DOCUMENTS 9,306,636 B2    4/2016    Kwon et al.
9,660,478 B2    5/2017    Von Novak et al.
(Continued)

FOREIGN PATENT DOCUMENTS

CN    106230048 A    12/2016
CN    206004355 U    3/2017
(Continued)

*Primary Examiner* — Edward Tso
*Assistant Examiner* — Aaron Piggush
(74) *Attorney, Agent, or Firm* — Eagle IP Limited; Jacqueline C. Lui

(57) ABSTRACT

A wireless power transmitter that supplies power to a wireless power receiver. The wireless power transmitter includes a control unit, a resonator and an amplifier. The control unit generates an identification information of the wireless power transmitter. The resonator transmits power to the wireless power receiver. The amplifier drives the resonator and is controlled by the control unit such that the power transmitted by the resonator includes a first signal that carries the identification information of the wireless power transmitter. The wireless power transmitter further includes a wireless communication unit that sends a second signal having the identification information of the wireless power transmitter. The wireless communication unit receives a third signal that is generated from the wireless receiver based on the first and second signals to determine whether to establish power connection in order to prevent cross connection between the wireless power transmitter and the wireless power receiver when the wireless power receiver is not charged by the wireless power transmitter.

17 Claims, 5 Drawing Sheets

(51) Int. Cl.
*H02J 7/02* (2016.01)
*H04W 76/30* (2018.01)

(58) Field of Classification Search
USPC .................................. 320/108, 141, 155, 160
See application file for complete search history.

(56) References Cited

U.S. PATENT DOCUMENTS

| | | | |
|---|---|---|---|
| 9,762,085 | B2 | 9/2017 | Von Novak, III et al. |
| 9,806,554 | B2 | 10/2017 | Lee et al. |
| 9,831,705 | B2 | 11/2017 | Von Novak et al. |
| 2009/0322158 | A1* | 12/2009 | Stevens .................. H02J 50/80 307/104 |
| 2014/0159653 | A1* | 6/2014 | Von Novak .......... H04B 5/0037 320/108 |
| 2015/0270740 | A1* | 9/2015 | Lee ........................ H02J 50/40 320/108 |
| 2016/0049826 | A1 | 2/2016 | Lee et al. |
| 2016/0301255 | A1 | 10/2016 | Zeine |
| 2016/0365747 | A1 | 12/2016 | Redding |
| 2017/0188179 | A1 | 6/2017 | Laudebat |
| 2017/0288471 | A1 | 10/2017 | Shirani-Mehr et al. |

FOREIGN PATENT DOCUMENTS

| | | |
|---|---|---|
| CN | 107040026 A | 8/2017 |
| CN | 107546803 A | 1/2018 |
| WO | 2017219705 A1 | 12/2017 |

\* cited by examiner

SYSTEM AND METHOD FOR PREVENTING CROSS CONNECTION IN WIRELESS CHARGING

FIELD OF THE INVENTION

The present invention relates to wireless charging, and more particularly to methods and systems that supply power to a wireless power receiver from a wireless power transmitter without cross connection.

BACKGROUND

There is an increasing number of electronic devices that are powered by rechargeable batteries. Wireless charging becomes more popular since it provides a convenient, safe, and reliable way to charge the electrical devices or wireless power receivers. Wireless power transfer systems and methods that efficiently and safely transfer power to electronic devices are desirable. In order to achieve high power transfer efficiency, the power transmitting unit (PTU) or wireless power transmitter communicates with the power receiving unit (PRU) or wireless power receiver. The PRU communicates with the PTU through out-band communication, which can be any wired or wireless communication channels including but not limited to WiFi and Bluetooth.

Cross connection occurs when a PRU has a power connection from a first PTU, but the PRU is communicating via a communication connection from a second PTU. Cross connection prevents the PTU from properly charging the PRU because the PTU as the wireless charging station cannot communicate with the PRU through out-band communication. Therefore, a method to verify the connection between PTU and PRU is needed.

New methods and systems that prevent cross connection between the wireless power transmitter and the wireless power receiver will assist in advancing technological needs and solving technological problems in the field of wireless power transfer.

SUMMARY OF THE INVENTION

One example embodiment is a wireless power transmitter that supplies power to a wireless power receiver. The wireless power transmitter includes a control unit, a resonator, amplifier and a wireless communication unit. The control unit generates an identification information of the wireless power transmitter. The resonator transmits power to the wireless power receiver. The amplifier drives the resonator and is controlled by the control unit such that the power transmitted by the resonator includes a first signal that carries the identification information of the wireless power transmitter. The wireless communication unit sends a second signal having identification information of the wireless power transmitter. The wireless communication unit receives a third signal that is generated from the wireless receiver based on the first and second signals to determine whether to establish power connection in order to prevent cross connection between the wireless power transmitter and the wireless power receiver when the wireless power receiver is not charged by the wireless power transmitter.

Another example embodiment is a wireless power transmitter that supplies power to a wireless power receiver and that includes a control unit, a resonator and an amplifier. The control unit generates an identification information of the wireless power transmitter. The resonator transmits power to the wireless power receiver. The amplifier drives the resonator and is controlled by the control unit such that the power transmitted by the resonator includes a first signal that carries an identification information of the wireless power transmitter. The first signal carries the identification information of the wireless power transmitter by transmitting the power from the resonator in different power levels. The power levels are predetermined and include a highest power level, a lowest power level and a number of power levels with a common difference. The wireless power transmitter receives a second signal from the wireless power receiver to determine whether to establish power connection with the wireless power receiver in order to prevent cross connection between the wireless power transmitter and the wireless power receiver.

Another example embodiment is a method of preventing cross connection in wireless charging between a wireless power transmitter and a wireless power receiver. The method including generating, by a control unit of the wireless power transmitter, an identification information of the wireless power transmitter; sending, from a resonator of the wireless power transmitter, a first signal that includes the identification information of the wireless power transmitter by transmitter power from the resonator in different power levels; and determining, based a comparison result between the first signal and a second signal, whether to establish power connection between the wireless power transmitter and the wireless power receiver in order to prevent cross connection between the wireless power transmitter and the wireless power receiver when the wireless power receiver is not charged by the wireless power transmitter. The power levels are predetermined and include a highest power level, a lowest power level and a number of power levels with a common difference.

Other example embodiments are discussed herein.

DETAILED DESCRIPTION

Figure 1:
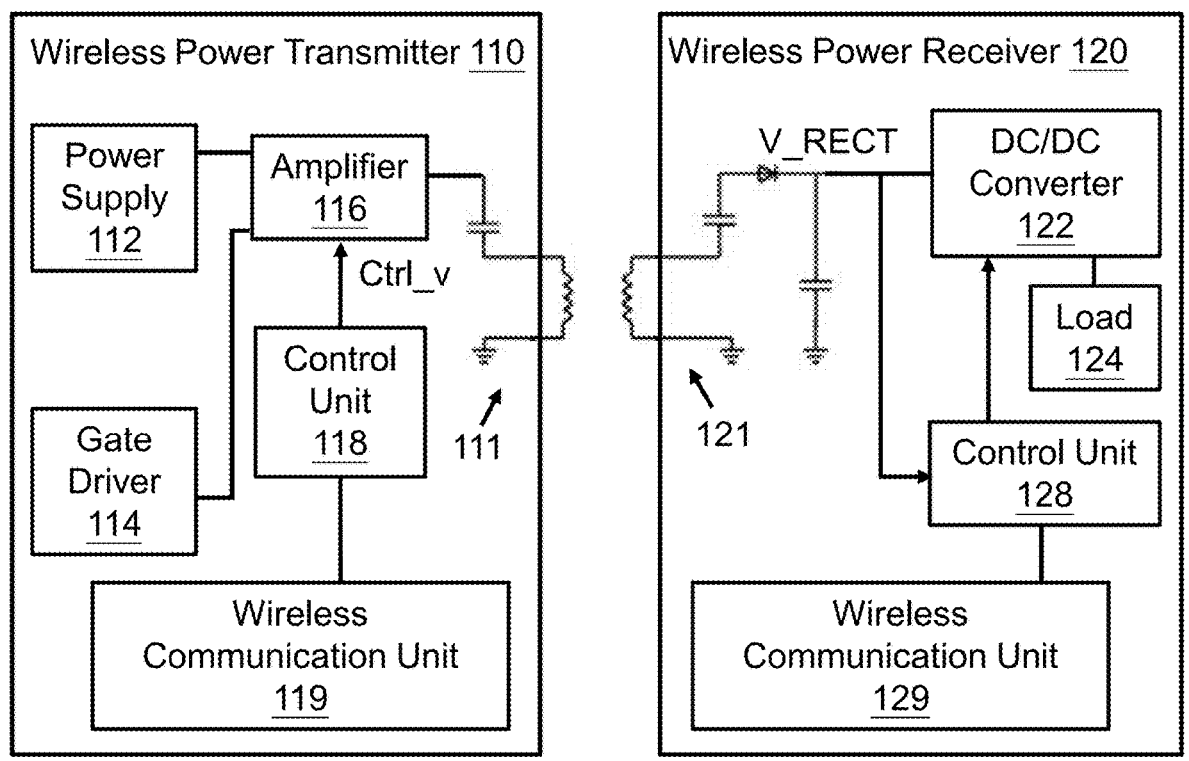
FIG. 1 shows a block diagram of a wireless power transfer system in accordance with an example embodiment.

Example embodiments relate to wireless power transfer systems and methods that supply power to a load wirelessly without cross connection between the wireless power transmitter and wireless power receiver.

In wireless charging, communications are established between a wireless power receiver or a PRU and a wireless power transmitter or a PTU where the PRU may be positioned within the wireless charging region of the PTU but is capable of establishing communications with one or more additional PTUs that do not have power connection with the PRU.

For example, a typical Bluetooth connection range is around 10 meters and a typical wireless power transfer range is around 10 to 30 centimeters. As a result, the PRU and PTU may communicate with each other even when they are spaced far apart from each other where it cannot transfer wireless power, which causes cross connection problem. Cross connection occurs when a PRU has a power connection from a first PTU, but the PRU is communicating via a communication connection from a second PTU. Cross connection prevents the PTU from properly charging the PRU because the PTU as the wireless charging station cannot communicate with the PRU being charged on the charging station.

Example embodiment solve the cross-connection problem through two-channel communication between the wireless power transmitter and the wireless power receiver. A signature is used to help the transmitter to identify whether it is connecting to the correct receiver. The first channel is a power link established between the resonators of the transmitter and the receiver. The power levels of the transmitter are variated to deliver an identification information of the wireless power transmitter to the receiver through the power channel established between resonators. The second channel is established through wireless communication. The wireless communication unit of the transmitter sends the identification information of the transmitter to the wireless communication unit of the receiver. The receiver compares the identification information received from the resonator in the first channel and from the wireless communication unit in the second channel to establish power connection with the transmitter only when the identification information received from the two channels match with each other, which prevents cross connection of the wireless power transmitter with the wireless power receiver.

In one example embodiment, the cross-connection problem is solved through the power link established via the resonators of the wireless power transmitter and the wireless power receiver. The power transmitted by the resonator of the transmitter carries an identification information of the transmitter, by transmitting the power from the resonator in different power levels. The power levels are predetermined and include a highest power level, a lowest power level and a number of power levels with a common difference. The wireless power receiver senses different power levels from the wireless power transmitter and obtains the identification information of the wireless power transmitter by comparing the power levels with the lowest power level and the highest power level sent from the transmitter in a form of preamble. The receiver further generates and sends back a feedback signature that includes the identification information of the wireless power transmitter and a signature of the wireless power receiver. As one example, the feedback signature is generated by a control unit of the receiver. The control unit controls a load current to vary a load impedance such that the feedback signature is carried by a variation of the load impedance and sensed by the resonator of the wireless power transmitter. The transmitter compares the identification information in the feedback signal with the identification information sent by the transmitter, establishes the power connection with the wireless power receiver when they match with each other, or disconnects with the wireless power receiver when they mismatch.

By way of example, a power transfer system contains two modes for transmitting power wirelessly from PTU to PRU, namely, standby mode and charging mode. The power level of standby mode is lower than the power level of charging mode. To transmit the identification information of the charger or the wireless power transmitter, a data transmitting mode is added, wherein the power level for transmitting data varies between a highest power level and a lowest power level. A preamble containing the highest and lowest power level used in data transmitting mode is transmitted from PTU to PRU before transmitting actual identification information for channel synchronization purpose. Between the highest and lowest power level used in data transmitting mode, a predetermined number of data transmitting level is defined and split equally. Each data transmitting level represents a predetermined data set. Multiple data sets are then transmitted serially from PTU to PRU.

FIG. 1 shows a block diagram of a wireless power transfer system 100 in accordance with an example embodiment.

The wireless power transfer system 100 includes a wireless power transmitter 110 and a wireless power receiver 120. The wireless power transmitter 110 includes a power supply 112 and a gate driver 114 that are connected with an amplifier 116 of a transmitting resonator 111. A control unit 118 connects with the amplifier 116 and further connects with a wireless communication unit 119. The wireless power receiver 120 includes a DC/DC converter 122 that is connected with a receiving resonator 121 and a load 124. A control unit 128 connects with the DC/DC converter 122, a wireless communication unit 129, and an output of a rectifier that connects with the resonator 121.

The wireless communication units 119 and 129 communicate with each other based on a predetermined scheme, such as Zig-bee, Wi-Fi and Bluetooth Low Energy (BLE).

In one example embodiment, the control unit 118 generates an identification information of the wireless power transmitter 110. The amplifier 116 is controlled by a control signal Ctrl_v from the control unit 118 such that the power transmitted by the transmitting resonator 111 includes a first signal that carries the identification information of the wireless power transmitter. The control signal Ctrl_v modifies the output voltage of the amplifier 116, which further modifies the power levels of the transmitting resonator 111. The receiving resonator 121 of the wireless power receiver 120 senses the varying power levels, which further leads to a varying rectifier output voltage V_RECT.

The wireless communication unit 119 sends a second signal that also contains the identification information of the wireless power transmitter. The wireless power receiver 120 receives the first and second signals, compares the second signal sent from the wireless communication unit 119 with the first signal sent from the transmitting resonator 111, determines whether to establish power connection and send a third signal to the wireless power transmitter 110 that includes the determination result.

For example, the wireless communication unit 119 receives the third signal from the wireless communication unit 129 of the wireless power receiver 120. The third signal triggers the power connection between the wireless power receiver and the wireless power transmitter when the first signal matches the second signal, which prevents cross connection between the wireless power transmitter and the wireless power receiver when the wireless power receiver is not charged by the wireless power transmitter. The third signal also initiates a disconnection of a communication link between the wireless communication unit of the wireless power transmitter and a wireless communication unit of the wireless power receiver when the first signal does not match the second signal.

In one example embodiment, the first signal carries the identification information of the wireless power transmitter by varying a power level of the power transmitted by the transmitting resonator 111. The first signal includes a preamble and a signature, the preamble including a highest power level and a lowest power level. The signature carries the identification information of the wireless power transmitter 110 and include at least one power level between the highest power level and the lowest power level. As one example, the power levels that reflect the identification information are predetermined and include a highest power level, a lowest power level and a number of power levels with a common difference.

By way of example, resonant coupling induces energy from magnetic fields between the transmitter resonator 111 and receiving resonator 121. A rectifier connects with the receiving resonator 121 to convert the AC signals from the receiving resonator to DC signals in order to supply DC power to the load. The DC/DC converter 122 is an electronic circuit or electromechanical device that converts a direct current (DC) from one voltage level to another that is suitable for the load 124. The receiving resonator 121 of the wireless power receiver 120 senses different power levels from the transmitting resonator 111 of the wireless power transmitter 110 and obtains the first signal that carries the identification information of the wireless power transmitter by comparing the power levels with a lowest power level and a highest power level. The lowest and highest power levels are included in the first signal as a preamble.

Figure 2:
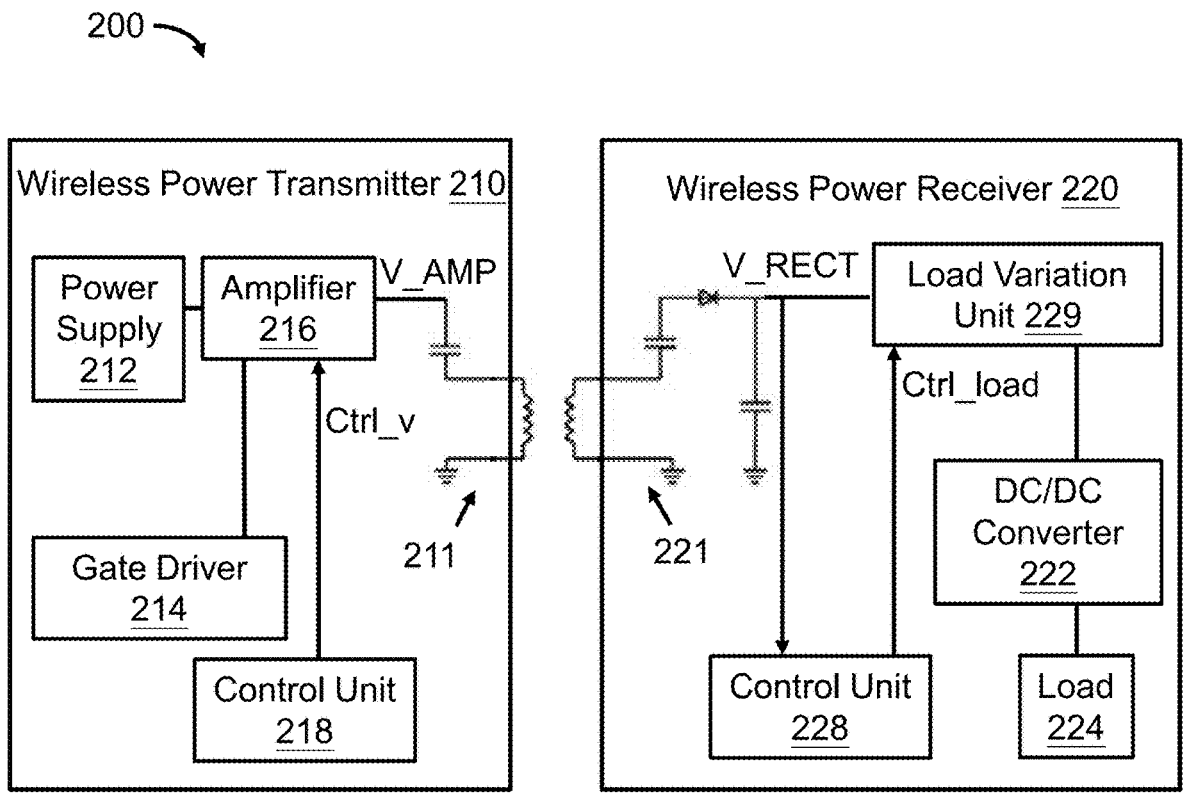
FIG. 2 shows a block diagram of a wireless power transfer system in accordance with another example embodiment.

FIG. 2 shows a block diagram of a wireless power transfer system 200 in accordance with another example embodiment.

The wireless power transfer system 200 includes a wireless power transmitter 210 and a wireless power receiver 220. The wireless power transmitter 210 includes a power supply 212 and a gate driver 214 that are connected with an amplifier 216 of a transmitting resonator 211. A control unit 218 connects with the amplifier 216 and controls a voltage level of the amplifier. The wireless power receiver 220 includes a DC/DC converter 222 that is connected with a load variation unit 229 and a load 224. A control unit 228 connects with the load variation unit 229 and an output of a rectifier that connects with the resonator 221.

In one example embodiment, the control unit 218 generates an identification information of the wireless power transmitter 210. The amplifier 216 is powered by the power supply 212 and driven by the gate driver 214, to drive the transmitting resonator 211. The amplifier 216 is controlled by the control unit 218 such that the power transmitted by the transmitting resonator includes a first signal that carries the identification information of the wireless power transmitter.

By way of example, the first signal carries the identification information of the wireless power transmitter 210 by transmitting the power from the transmitting resonator 211 in different power levels. The power levels are predetermined and include a highest power level, a lowest power level and a number of power levels with a common difference. The wireless power transmitter 210 receives a second signal from the wireless power receiver 220 to determine whether to establish power connection with the wireless power receiver in order to prevent cross connection between the wireless power transmitter and the wireless power receiver.

By way of example, resonant coupling induces energy from magnetic fields between the transmitter resonator 211 and receiving resonator 221. A rectifier connects with the receiving resonator 221 to convert the AC signals from the receiving resonator to DC signals in order to supply DC power to the load. The DC/DC converter 222 is an electronic circuit or electromechanical device that converts a direct current (DC) from one voltage level to another that is suitable for the load 224.

The first signal carries the identification information of the wireless power transmitter 210 by varying a power level of the power transmitted by the transmitting resonator 211. The first signal includes a preamble and a signature. The preamble includes a highest power level and a lowest power level. The signature carries the identification information of the wireless power transmitter 210 and includes one or more power levels between the highest power level and the lowest power level. The receiving resonator 221 of the wireless power receiver 220 senses different power levels from the transmitting resonator 211 of the wireless power transmitter 210 and obtains the first signal that carries the identification information of the wireless power transmitter by comparing the power levels with a lowest power level and a highest power level. The lowest and highest power levels are included in the first signal as a preamble.

The wireless power receiver 220 senses different power levels from the wireless power transmitter 210 and obtains the first signal that carries the identification information of the wireless power transmitter by comparing the power levels with a lowest power level and a highest power level. The lowest and highest power levels are included in the first signal as a preamble. The second signal is generated by the control unit 228 of the wireless power receiver 220. The second signal includes the identification information of the wireless power transmitter 210 and a signature of the wireless power receiver 220. The control unit 228 controls a load current to vary a load impedance of the load variation unit 229, such that the second signal is carried by a variation of the load impedance.

In one example embodiment, the wireless power transmitter 210 compares the second signal with the first signal, establishes the power connection with the wireless power receiver 220 when the second signal matches the first signal, or disconnects with the wireless power receiver 220 when the second signal does not match the first signal.

Figure 3:
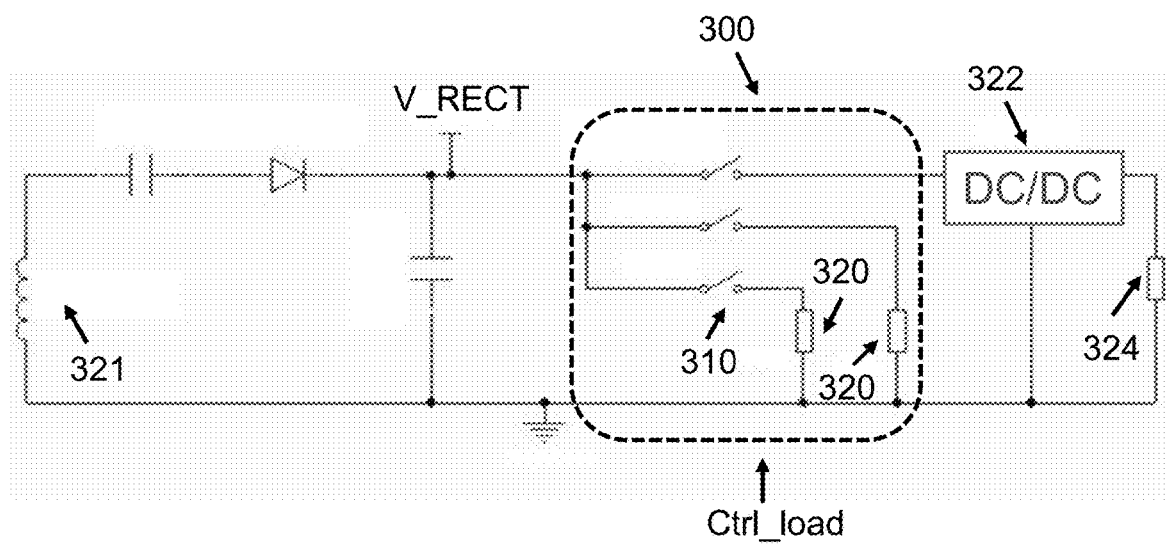
FIG. 3 shows a circuit diagram of a load variation circuit in accordance with an example embodiment.

FIG. 3 shows a circuit diagram of a load variation circuit 300 in accordance with an example embodiment. As shown in FIG. 3 and with reference to FIG. 2, the load variation circuit 300 is controlled by a control signal Ctrl_load sent from the control unit 228. The load variation circuit is also connected with the DC/DC converter 322.

The load variation circuit 300 includes a plurality of resistors 320 and switches 310. The resistors are connected with each other in parallel to achieve different resistance values for the load variation circuit by turning on one or more of the switches by the control unit via the control signal. Each of the resistance value corresponds to a load impedance of the wireless power receiver.

The load variation circuit functions to modify the load impedance and load current to generate the feedback signal from the wireless power receiver to the wireless power transmitter.

By varying the load impedance through the load variation circuit 300, a two-way communication is established between the transmitting resonator of the wireless power transmitter and the receiving resonator of the wireless power receiver. The power transmitted by the resonator of the transmitter carries an identification information of the transmitter, by transmitting the power from the resonator in different power levels. The wireless power receiver senses different power levels from the wireless power transmitter and obtains the identification information of the wireless power transmitter by comparing the power levels with the lowest power level and the highest power level sent from the transmitter in a form of preamble. The receiver further generates and sends back a feedback signature that includes the identification information of the wireless power transmitter and a signature of the wireless power receiver.

As one example, the feedback signature is carried by a variation of the load impedance and sensed by the transmitting resonator of the wireless power transmitter. The transmitter compares the identification information in the feedback signal with the identification information sent by the transmitter, and establishes the power connection with the wireless power receiver when they match with each other, or disconnects with the wireless power receiver when they mismatch.

Figure 4:
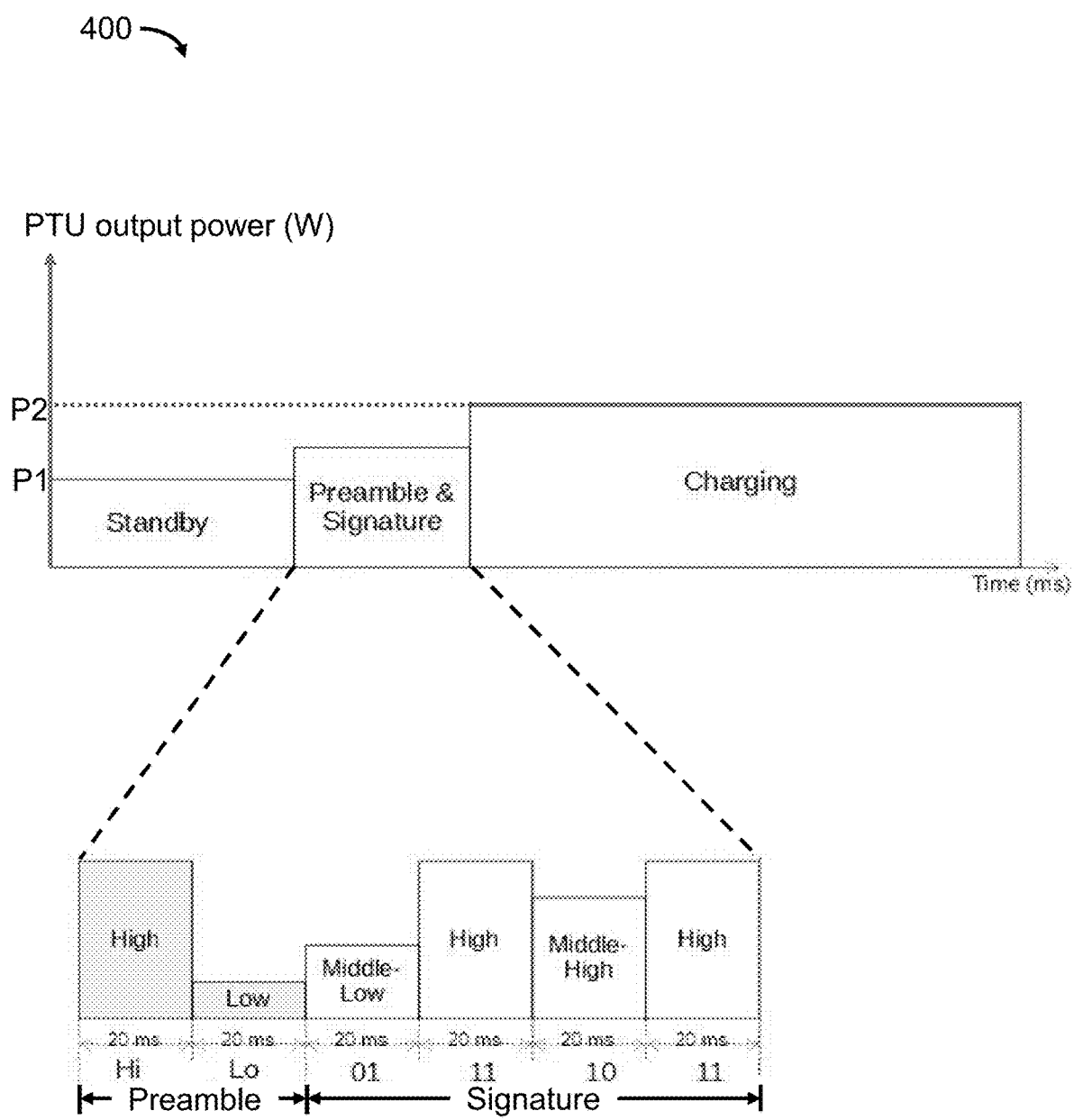
FIG. 4 shows a method of transmitting the identification information of the wireless power transmitter in a standby mode in accordance with an example embodiment.

FIG. 4 shows a method 400 of transmitting the identification information of the wireless power transmitter in a standby mode in accordance with an example embodiment. The x-axis shows time in millisecond (ms) and the y-axis shows PTU output power in watt (W).

Figure 5:
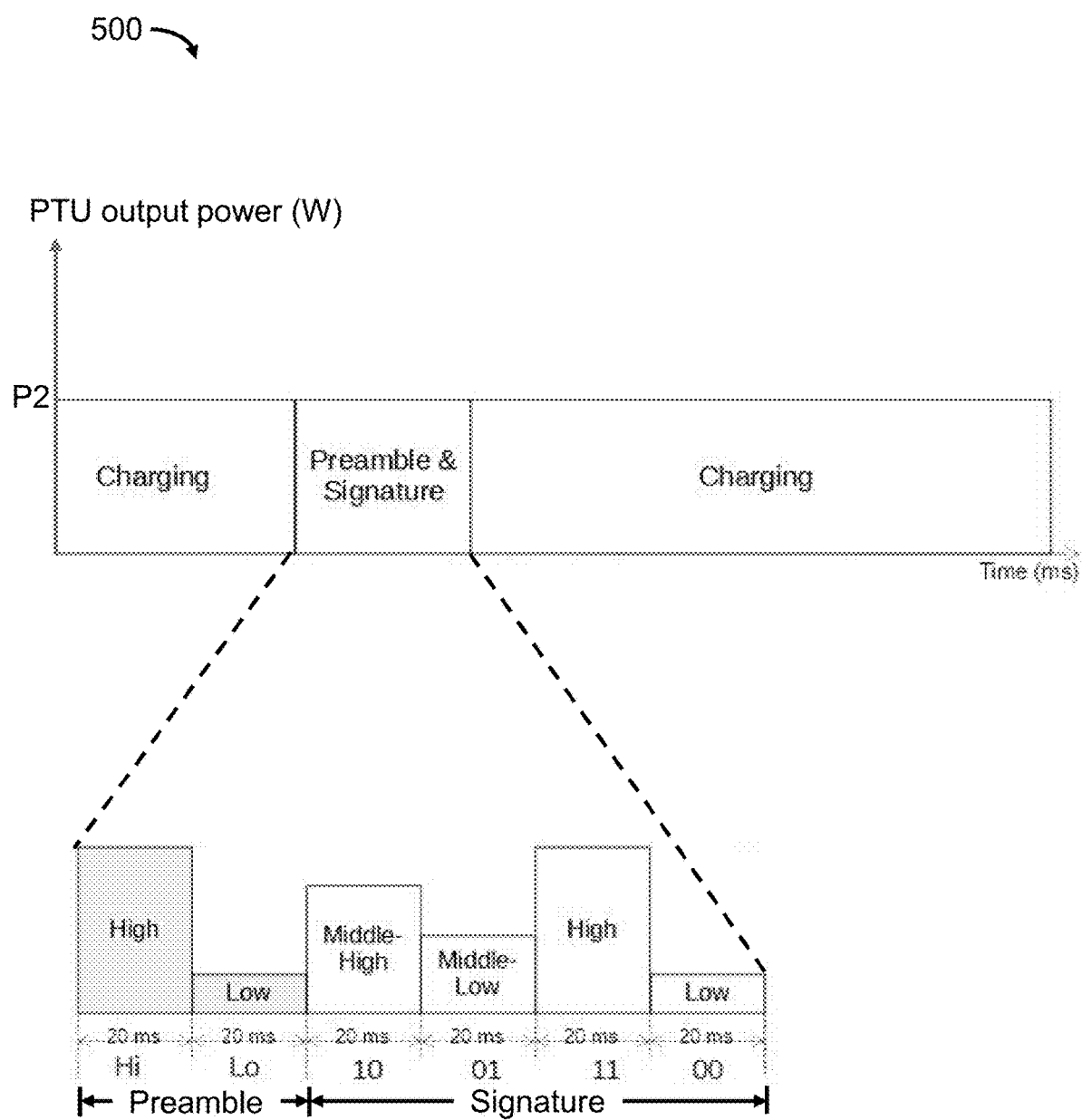
FIG. 5 shows a method of transmitting the identification information of the wireless power transmitter in a charging mode in accordance with an example embodiment.

FIG. 5 shows a method 500 of transmitting the identification information of the wireless power transmitter in a charging mode in accordance with an example embodiment. The x-axis shows time in millisecond (ms) and the y-axis shows PTU output power in watt (W).

Consider an example in which a wireless charging system includes a power transmitting unit (PTU) and one or more power receiving units (PRUs). The PTU wirelessly charges the PRU through resonant coupling when the PRU is placed within the charging range of the PTU. Power connection is established between a transmitting (Tx) resonator of the PTU and a receiving (Rx) resonator of the PRU.

The output power of the PTU is variated to deliver a signature of the PTU to the PRU through the resonators. In another word, the power transmitted by the Tx resonator of the PTU carries the signature or identification information of the PTU, by transmitting the power in different power levels.

When the PTU is charging the PRU, the power connection is established and both units are in a charging mode. Other than the charging mode, the PTU and PRU have a standby mode in which no power connection is established between them and a signature data transmitting mode in which the PTU and PRU communicate with each other to exchange signature data through one or more communication channels.

As shown in FIG. 4, the PTU and PRU are initially in a standby mode in which no power connection is established between them. In the standby mode, the PTU output power is P1, which is lower than the output power P2 when the PTU is in charging mode. When a PRU is detected by the PTU through a communication channel, the PTU generates a signature and send the signature to the PRU through the communication channel, which is performed in a signature data transmitting mode. By way of example, the communication channel is a power connection or link between resonators of the PTU and PRU.

By way of example, the power connection is established by resonance coupling between the Tx resonator of the PTU and the Rx resonator of the PRU. The Tx resonator sends the signature data of the PTU through a sequence of power levels. The signature data transmitting mode comprises a preamble state in which the highest power level (Hi) and the lowest power level (Lo) to be used to transmit the signature data is sent from the PTU to the PRU as a reference. The preamble is sent before transmitting signature data for synchronization purpose.

In one example embodiment, the output power levels of the PTU in signature data transmitting mode are predetermined based on the signature and include three power levels. As one example, the three power levels have a common difference of 0.5 W and the three power levels are 1 W, 1.5 W and 2 W. As shown in FIG. 4, the signature is represented by a sequence of three power levels between the power levels in standby mode and in charging mode. The highest power level represents 11 in binary form, the middle-high power level represents 10 in binary form, the middle-low power level represents 01 in binary form, and the lowest power level represents 00 in binary form. The PTU transmits the signature by transmitting middle-low, high, middle-high and high power levels serially. Therefore, the signature data is 01111011 in binary form.

The PRU senses different power levels from the PTU and retrieves the signature 01111011 of the PTU by comparing the sensed power levels with the lowest power level and the highest power level sent from the PTU in the preamble.

As shown in FIG. 5, the PTU and PRU are initially in a charging mode in which the PTU is charging a first PRU. In the charging mode, the PTU output power is P2. When a second PRU is detected by the PTU through a communication channel, the PTU sends a signature to the second PRU through the communication channel, which is performed in a signature data transmitting mode. By way of example, the communication channel is a power connection between resonators of the PTU and PRU.

By way of example, the power connection is established by resonance coupling between the Tx resonator of the PTU and the Rx resonator of the PRU. The Tx resonator sends the signature data of the PTU through a sequence of power levels. The signature data transmitting mode comprises a preamble state in which the highest power level (Hi) and the lowest power level (Lo) to be used to transmit the signature data is sent from the PTU to the PRU as a reference. The preamble is sent before transmitting signature data for synchronization purpose.

In one example embodiment, the output power levels of the PTU in signature data transmitting mode are predetermined based on the signature and include four power levels. As one example, the four power levels have a common difference of 0.5 W and the four power levels from the lowest power level to the highest power level are 0.5 W, 1 W, 1.5 W and 2 W. As shown in FIG. 5, the signature is represented by a sequence of power levels between the lowest power level and the highest power level. The highest power level represents 11 in binary form, the middle-high power level represents 10 in binary form, the middle-low power level represents 01 in binary form, and the lowest power level represents 00 in binary form. The PTU transmits the signature by transmitting middle-high, middle-low, high, and low power levels serially. Therefore, the signature data is 10011100 in binary form.

The second PRU senses different power levels from the PTU and retrieves the signature 10011100 of the PTU by comparing the sensed power levels with the lowest power level and the highest power level sent from the PTU in the preamble.

Figure 6:
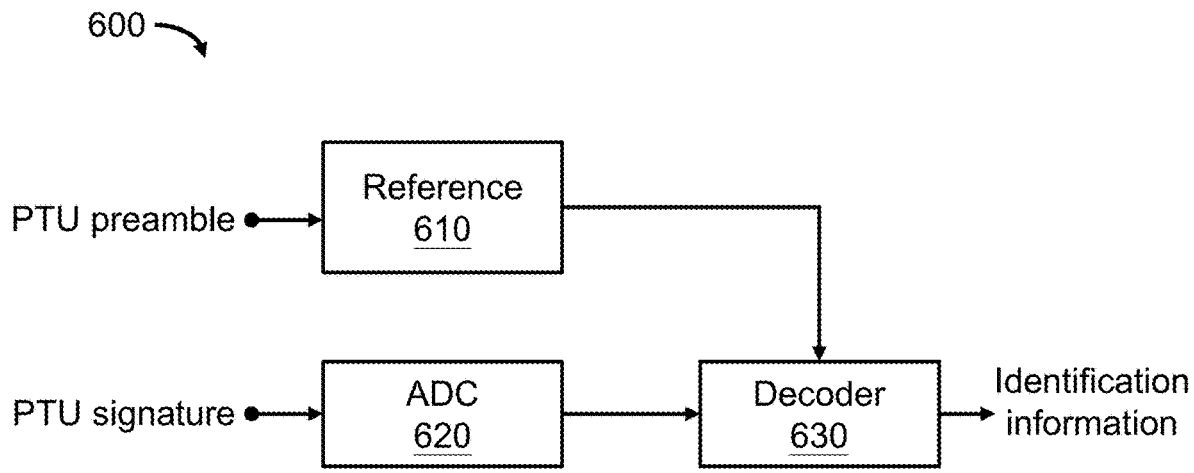
FIG. 6 shows a block diagram of a decoder of the wireless power receiver in accordance with an example embodiment.

FIG. 6 shows a block diagram of a decoder 600 of the wireless power receiver in accordance with an example embodiment.

With reference to FIG. 1-FIG. 5, the PTU sends a preamble to the wireless power receiver 600 or PRU as a refence 610. The reference 610 includes a lowest power level and a highest power level such as 0.2 W and 2.2 W. The PTU also sends a signature that includes identification information of the PTU to an analog to digital converter (ADC) of the PRU. The ADC of the PRU converts the PTU signature into digital signals. The digital signals are further sent to a decoder 630 of the PRU. The decoder decodes the digital signals to retrieve the identification information of the PTU by comparing the digital signals with the reference.

Figure 7:
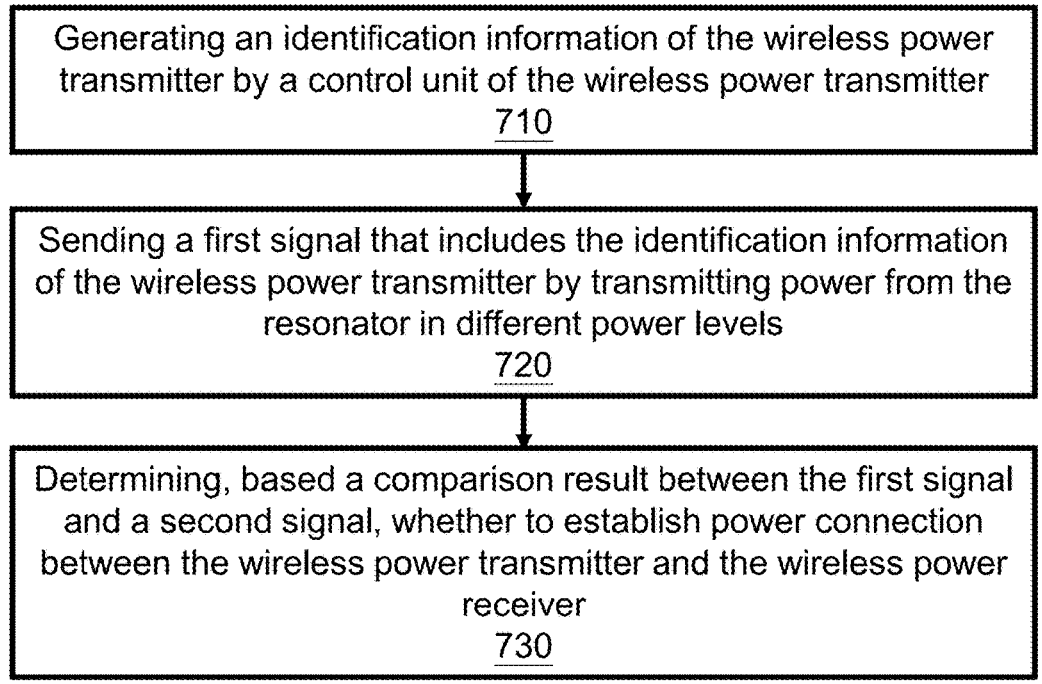
FIG. 7 shows a method executed by a wireless power transfer system in accordance with an example embodiment.

FIG. 7 shows a method executed by a wireless power transfer system in accordance with an example embodiment.

Block 710 states generating an identification information of the wireless power transmitter by a control unit of the wireless power transmitter.

Consider an example in which a wireless charging system includes one or more wireless power transmitters and one or more wireless power receivers. The wireless power transmitter wirelessly charges the wireless power receiver through resonant coupling when the receivers is placed within the charging range of the transmitter. Power connection is established between a transmitting (Tx) resonator of the transmitter and a receiving (Rx) resonator of the receiver.

By way of example, the wireless power transmitter includes a control unit that generates random or dedicated identification information for the wireless power transmitter.

Block 720 states sending a first signal that includes the identification information of the wireless power transmitter by transmitting power from the resonator in different power levels.

To send the identification information of the wireless power transmitter, a first signal is sent from the wireless power transmitter to the wireless power receiver. In the first signal, the output power of the transmitter is variated to deliver the identification information to the wireless power receiver through the resonators. In another word, the power transmitted by the Tx resonator of the transmitter carries the signature or identification information of the transmitter, by transmitting the power in different power levels.

The wireless power receiver senses different power levels from the wireless power transmitter and obtains the first signal that carries the identification information of the wireless power transmitter by comparing the power levels with the lowest power level and the highest power level. The lowest and highest power levels are included in the first signal as a preamble.

Block 730 states determining, based a comparison result between the first signal and a second signal, whether to establish power connection between the wireless power transmitter and the wireless power receiver.

In one example embodiment and with reference to FIG. 1, the wireless power transmitter and receiver include wireless communication units such as Bluetooth to communicate with each other through a second channel other than the power connection. The second signal is sent from the transmitter to the receiver through the wireless communication units. The second signal carries the same identification information of the wireless power transmitter as in the first signal.

The wireless power receiver receives the first signal through the power connection and second signal through the wireless communication. The receiver further compares the first and second signals and determines whether to establish the power connection based on the comparison result. When the first signal matches the second signal, the wireless power receiver triggering the power connection with the wireless power transmitter.

In another example and with reference to FIG. 2, the second signal is generated by a control unit of the wireless power receiver and is sent from the receiver to the transmitter. The second signal includes the identification information of the wireless power transmitter and a signature of the wireless power receiver. The control unit controls a load impedance such that the second signal is carried by a variation of the load impedance of the wireless power receiver.

The wireless power transmitter compares the second signal with the first signal and establishes the power connection with the wireless power receiver when the second signal matches the first signal. If the second signal does not match the first signal, the wireless power transmitter disconnects with the wireless power receiver.

As used herein, a "wireless power transmitter" is a transmitter that transfers electrical energy to an electrical load or a wireless power receiver wirelessly.

As used herein, a "DC/DC converter" is an electronic circuit or electromechanical device that converts a source of direct current (DC) from one voltage level to another.

As used herein, a "control unit" is a combinatorial circuit that outputs a set of control signals based on input signals.

The methods and apparatus in accordance with example embodiments are provided as examples, and examples from one method or apparatus should not be construed to limit examples from another method or apparatus. Further, methods and apparatus discussed within different figures can be added to or exchanged with methods and apparatus in other figures. Further yet, specific numerical data values (such as specific quantities, numbers, categories, power levels etc.) or other specific information should be interpreted as illustrative for discussing example embodiments.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

What is claimed is:

1. A wireless power transmitter that supplies power to a wireless power receiver, the wireless power transmitter comprising:
   a control unit that generates an identification information of the wireless power transmitter;
   a resonator that transmits power to the wireless power receiver;
   an amplifier that drives the resonator and is controlled by the control unit such that the power transmitted by the resonator includes a first signal that carries the identification information of the wireless power transmitter by varying a power level of the power transmitted by the resonator, the first signal including a preamble and a signature, the preamble including a highest power level and a lowest power level, the signature carrying the identification information of the wireless power transmitter and including at least one power level between the highest power level and the lowest power level; and
   a wireless communication unit that sends a second signal comprising the identification information of the wireless power transmitter over a wireless communication channel;
   wherein the wireless communication unit receives a third signal from the wireless power receiver to determine whether to establish power connection in order to prevent cross connection between the wireless power transmitter and the wireless power receiver when the wireless power receiver is not charged by the wireless power transmitter, and wherein the third signal is generated by the wireless power receiver based on the first and second signals.

2. The wireless power transmitter of the claim 1, wherein the wireless power receiver compares the second signal sent from the wireless power transmitter with the first signal to determine whether to establish the power connection with the wireless power transmitter.

3. The wireless power transmitter of the claim 1, wherein the third signal is sent from a wireless communication unit of the wireless power receiver to the wireless communication unit of the wireless power transmitter, the third signal triggering the power connection between the wireless power receiver and the wireless power transmitter when the first signal matches the second signal.

4. The wireless power transmitter of the claim 1, wherein the third signal initiates a disconnection of a communication link between the wireless communication unit of the wireless power transmitter and a wireless communication unit of the wireless power receiver when the first signal does not match the second signal.

5. The wireless power transmitter of the claim 1, wherein the first signal carries the identification information of the wireless power transmitter by transmitting the power from the resonator in different power levels, the power levels are predetermined and include the highest power level, the lowest power level and a number of power levels with a common difference.

6. The wireless power transmitter of the claim 1, wherein the wireless power receiver senses different power levels from the wireless power transmitter and obtains the first signal that carries the identification information of the wireless power transmitter by comparing the power levels with the lowest power level and the highest power level.

7. A wireless power transmitter that supplies power to a wireless power receiver, the wireless power transmitter comprising:
a control unit that generates an identification information of the wireless power transmitter;
a resonator that transmits power to the wireless power receiver; and
an amplifier that drives the resonator and is controlled by the control unit such that the power transmitted by the resonator includes a first signal that carries an identification information of the wireless power transmitter,
wherein the first signal carries the identification information of the wireless power transmitter by transmitting the power from the resonator in different power levels, and the first signal includes a preamble and a signature, the preamble including a highest power level and a lowest power level, the signature carrying the identification information of the wireless power transmitter and including at least one power level between the highest power level and the lowest power level, and
wherein the wireless power transmitter receives a second signal, from the wireless power receiver, including the identification information of the wireless power transmitter and a signature of the wireless power receiver to determine whether to establish power connection with the wireless power receiver in order to prevent cross connection between the wireless power transmitter and the wireless power receiver.

8. The wireless power transmitter of the claim 7, wherein the wireless power receiver senses different power levels from the wireless power transmitter and obtains the first signal that carries the identification information of the wireless power transmitter by comparing the power levels with the lowest power level and the highest power level.

9. The wireless power transmitter of the claim 7, wherein the second signal is generated by a control unit in the wireless power receiver, the control unit controlling a load current to vary a load impedance such that the second signal is carried by a variation of the load impedance.

10. The wireless power transmitter of the claim 7, wherein the wireless power transmitter compares the second signal with the first signal, establishes the power connection with the wireless power receiver when the second signal matches the first signal, or disconnects with the wireless power receiver when the second signal does not match the first signal.

11. A method of preventing cross connection in wireless charging between a wireless power transmitter and a wireless power receiver, the method comprising:
generating, by a control unit of the wireless power transmitter, an identification information of the wireless power transmitter;
sending, from a resonator of the wireless power transmitter, a first signal that carries the identification information of the wireless power transmitter by transmitting power from the resonator in different power levels, wherein the first signal includes a preamble and a signature, the preamble including a highest power level and a lowest power level, the signature carrying the identification information of the wireless power transmitter and including at least one power level between the highest power level and the lowest power level; and
determining, based on a comparison result between the first signal and a second signal, whether to establish power connection between the wireless power transmitter and the wireless power receiver in order to prevent cross connection between the wireless power transmitter and the wireless power receiver when the wireless power receiver is not charged by the wireless power transmitter, wherein the second signal includes at least the identification information of the wireless power transmitter.

12. The method of claim 11, wherein the wireless power receiver senses different power levels from the wireless power transmitter and obtains the first signal that carries the identification information of the wireless power transmitter by comparing the power levels with the lowest power level and the highest power level.

13. The method of claim 11, wherein the second signal carries the identification information of the wireless power transmitter and is sent from a wireless communication unit of the wireless power transmitter and received by a wireless communication unit of the wireless power receiver.

14. The method of claim 13, wherein the wireless power receiver receives the first and second signals from the wireless power transmitter and determines whether to establish the power connection based on the comparison result of the first and second signals, the wireless power receiver triggering the power connection when the first signal matches the second signal.

15. The method of claim 11, wherein the second signal is sent from the wireless power receiver and includes the identification information of the wireless power transmitter and a signature of the wireless power receiver.

16. The method of claim 11, wherein the second signal is generated by a control unit in the wireless power receiver, the control unit controlling a load current to vary a load impedance such that the second signal is carried by a variation of the load impedance.

17. The method of claim 15, wherein the wireless power transmitter compares the second signal with the first signal, establishes the power connection with the wireless power receiver when the second signal matches the first signal, or disconnects with the wireless power receiver when the second signal does not match the first signal.

\* \* \* \* \*